United States Patent
Sasaki et al.

(10) Patent No.: US 6,339,578 B1
(45) Date of Patent: Jan. 15, 2002

(54) OPTICAL DISK RECORDING APPARATUS

(75) Inventors: Akinori Sasaki; Takashi Kusunose, both of Matsuyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/389,624

(22) Filed: Sep. 3, 1999

(51) Int. Cl.[7] .................................................. G11B 7/00
(52) U.S. Cl. ....................................... 369/116; 369/47.5
(58) Field of Search ................................. 369/116, 121, 369/47.5, 53.26

(56) References Cited

U.S. PATENT DOCUMENTS 5,563,862 A * 10/1996 Udagawa .................... 369/116

FOREIGN PATENT DOCUMENTS

JP          6-349066          12/1994

* cited by examiner

Primary Examiner—Nabil Hindi
(74) Attorney, Agent, or Firm—Wenderoth, Lind & Ponack, L.L.P.

(57) ABSTRACT

The present invention provides an optical disk recording apparatus which can reduce consumption of a power calibration area and prevent recording quality from being deteriorated by appropriately renewing an optimum recording power, and a method for setting an optimum recording power in an optical disk recording apparatus. The optical disk recording apparatus stores an optimum recording power which is obtained by performing trial writing in the power calibration area and an amplitude level Am of a reproduction signal, and in case of additional recording in a write-once optical disk, obtains an amplitude level Ar by reproducing again the area in which the trial writing is previously performed, and compares the stored amplitude level Am with the amplitude level Ar. When the amplitude level is lowered, an optimum recording power is renewed by performing trial writing again, and when the amplitude level is not lowered, the additional recording is performed using the stored optimum recording power.

2 Claims, 2 Drawing Sheets

OPTICAL DISK RECORDING APPARATUS

FIELD OF THE INVENTION

The present invention relates to an optical disk recording apparatus and, more particularly, to an optical disk recording apparatus having a structure for calibrating an optimum recording power when data is recorded on an optical disk.

BACKGROUND OF THE INVENTION

When data is recorded on a write-once optical disk or the like, in order to obtain stable recording quality, trial writing is performed in a power calibration area on the disk prior to recording, by using plural different recording power values. Then, the area in which the trial writing is performed is reproduced to detect asymmetry of reproduction signals (RF signals), whereby an optimum recording power at the recording is set.

Usually, trial writings can be performed one hundred times in a power calibration area of a write-once optical disk. Therefore, consumption of the calibration area should be reduced. Conventionally, the consumption of the calibration area has been reduced in the following way.

When the trial writing is performed once and an optimum recording power is detected, the detected optimum recording power is stored in a memory in an optical disk recording apparatus, together with a disk identification code for identifying the disk. In case of write-once optical disks, information of a disk in process of recording is held in a PMA (program memory area) of the disk, where a disk identification code for identifying each disk can also be recorded.

When additional recording is performed, the disk identification code is read out from the PMA, while the optimum recording power corresponding to the disk identification code is read out from the memory in the optical disk recording apparatus. Then, additional recording is performed using the readout optimum recording power. Thereby, even if the additional recording is performed after the disk is taken out and then reinserted, or the power is turned off and then turned on, recording can be performed without performing the trial writing again, thereby reducing the consumption of the calibration area.

As an example, Japanese published patent Hei. 6-349066 discloses a recording laser power setting apparatus which can obtain an optimum recording laser power corresponding to each CD-R disk However, the above-mentioned conventional structure in the optical disk recording apparatus, for reading out the optimum recording power corresponding to each disk from the memory therein, to perform additional recording has the following problem. Due to changes with time in a pickup in the optical disk recording apparatus, particularly dirt or dust accumulated in the pickup, the optimum recording power changes. Consequently, if recording is performed using the optimum recording power stored in the memory, the recording quality is deteriorated.

SUMMARY OF THE INVENTION

The present invention is made to solve the above-mentioned problem, and it is an object of the present invention is to provide an optical disk recording apparatus which can reduce consumption of the power calibration area, as well as cope with changes with time in a pickup.

Other objects and advantages of the present invention will become apparent from the detailed description and a specific embodiment described is provided only for illustration since various additions and modifications within the spirit and scope of the invention will be apparent to those of skill in the art from the detailed description.

According to a method of the present invention, the above object can be achieved by checking whether there is a change in an optimum recording power for each disk stored in a memory in an optical disk recording apparatus prior to additional recording on an optical disk, deciding whether desired recording quality can be obtained if the additional recording is performed using the stored optimum recording power, and when it is decided that some problems occur if the stored optimum recording power is used, performing trial writing again to set a new optimum recording power.

An optical disk recording apparatus according to a first aspect of the present invention comprises: an optimum recording power setting unit for obtaining an optimum recording power of a laser diode when data is recorded on an optical disk, by performing trial writing in a power calibration area on the optical disk; an amplitude level calculating unit for obtaining an amplitude level of a reproduction signal which is obtained by reproducing an area in the power calibration area in which the trial writing is performed with the obtained optimum recording power; a memory for storing the obtained optimum recording power and the amplitude level of the reproduction signal; and a comparing unit for comparing a difference between the amplitude level of the reproduction signal stored in the memory and an amplitude level of a reproduction signal which is obtained by reproducing again the area in which the trial writing is performed with the optimum recording power, to a prescribed value, when additional recording is performed on the optical disk; wherein the optimum recording power setting unit performs trial writing in the power calibration area and sets an optimum recording power to be used in the additional recording when the comparing unit decides that the difference exceeds the prescribed value, and sets the optimum recording power stored in the memory as an optimum recording power to be used in the additional recording when the comparing unit decides that the difference does not exceed the prescribed value. Therefore, even when there are changes with time in the pickup of the optical disk recording apparatus, or particularly, dirt or dust are accumulated in the pickup, the optimum recording power can be set again, thereby preventing the recording quality from being deteriorated.

A method for setting an optimum recording power in an optical disk recording apparatus according to a second aspect of the present invention comprises the steps of: obtaining an optimum recording power of a laser diode when data is recorded on an optical disk, by performing trial writing in a power calibration area on the optical disk; obtaining an amplitude level of a reproduction signal which is obtained by reproducing an area in the power calibration area in which the trial writing is performed with the obtained optimum recording power; storing the obtained optimum recording power and the amplitude level in the memory; when additional recording is performed in the optical disk, comparing a difference between the amplitude level of the reproduction signal stored in the memory and an amplitude level of a reproduction signal which is obtained by reproducing again the area in which the trial writing is performed with the optimum recording power, to a prescribed value; performing trial writing in the power calibration area and setting an optimum recording power to be used in the additional recording when it is decided that the difference exceeds the prescribed value; and setting the optimum recording power stored in the memory as an optimum recording power to be used in the additional recording when it is decided that the difference does not exceed the prescribed value. Therefore, effects as those in the first aspect of the present invention are obtained.

DETAILED DESCRIPTION OF THE PREFERRED EMBODIMENTS

Figure 1:
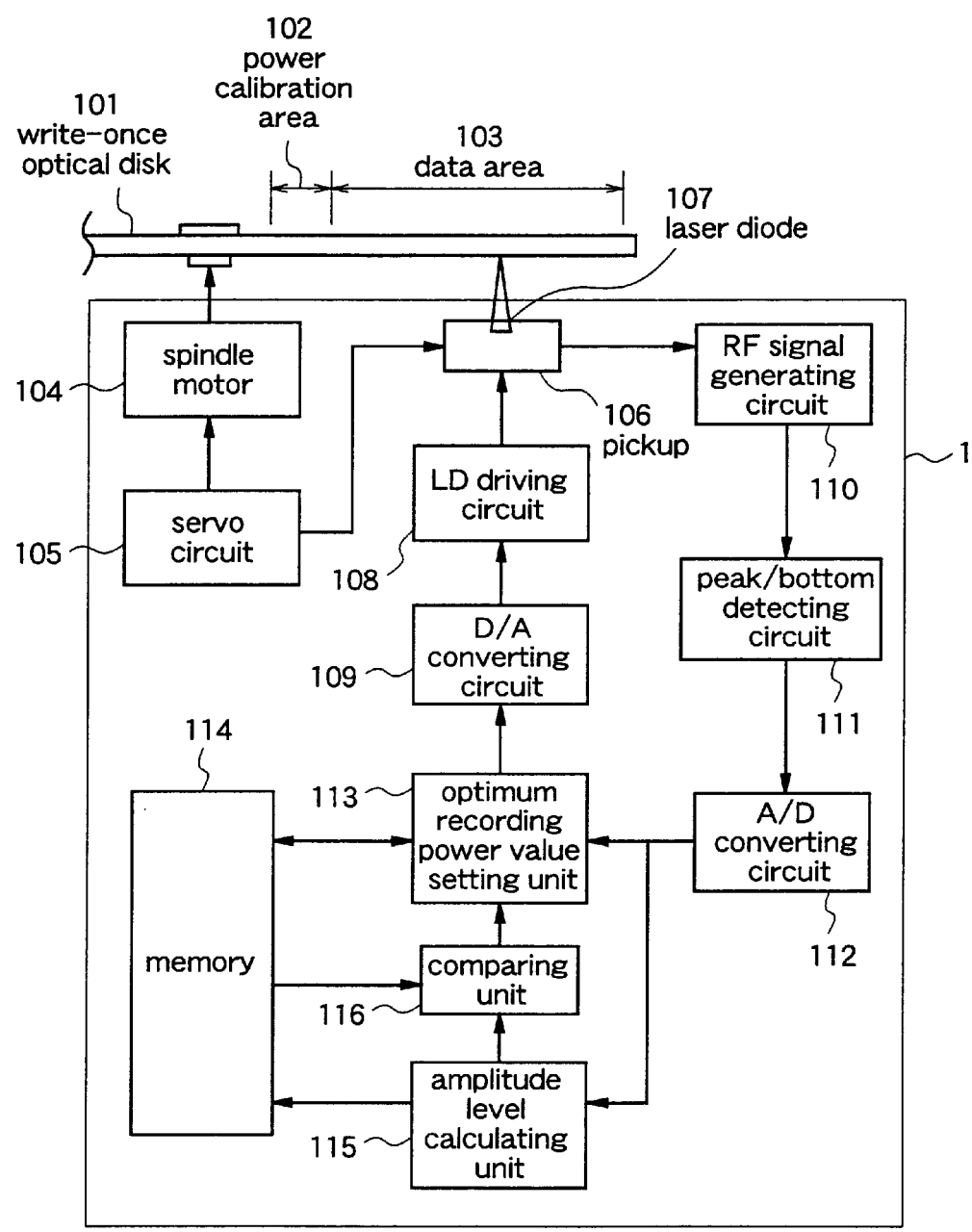
FIG. 1 is a block diagram illustrating an optical disk recording apparatus 1 according to an embodiment of the present invention.

An embodiment of the present invention will be described with reference to the attached figures. FIG. 1 is a block diagram illustrating an optical disk recording apparatus 1 according to the embodiment of the present invention.

The optical disk recording apparatus 1 comprises a spindle motor 104 for driving a write-once optical disk 101, a servo circuit 105 for controlling rotation of the spindle motor 104, a pickup 106 for recording data in a data area 103 on the write-once optical disk 101, the pickup 106 mounting a laser diode 107, a LD driving circuit 108 for driving the laser diode 107, a D/A converting circuit 109 for obtaining a driving current for driving the LD driving circuit 108, an RF signal generating circuit 110 for generating a reproduction signal (RF signal) from a signal which is obtained by reading out a power calibration area 102 by the pickup 106, a peak/bottom detecting circuit 111 for detecting a peak level and a bottom level of the RF signal, an A/D converting circuit 112 for A/D-converting the peak level and the bottom level, an optimum recording power setting unit for setting a recording power value of the laser diode 107, a memory for storing the optimum recording power and an amplitude level which is described later, an amplitude level calculating unit 115 for detecting an amplitude level Am of the RF signal, and a comparing unit 116 for comparing an amplitude level Ar detected at additional recording with the amplitude level Am stored in the memory 114.

The optimum recording power setting unit 113 obtains an optimum recording power of a light emitted from the laser diode 107 when data is recorded on the optical disk 101, by performing trial writing in the power calibration area 102 on the optical disk 101, and records the obtained power value in the memory 114. In performing additional recording, when the comparing unit 116 decides that difference between the amplitude levels Ar and Am exceeds a prescribed value by an operation as described later, the optimum recording power setting unit 113 performs trial writing in the power calibration area 102 and sets an optimum recording power to be used at the additional recording. When the comparing unit 116 decides that the difference between the amplitude levels Ar and Am does not exceed the prescribed value, the optimum recording power setting unit 113 sets the optimum recording power stored in the memory 114 as an optimum recording power to be used at the additional recording in the optical disk 101.

Figure 2:
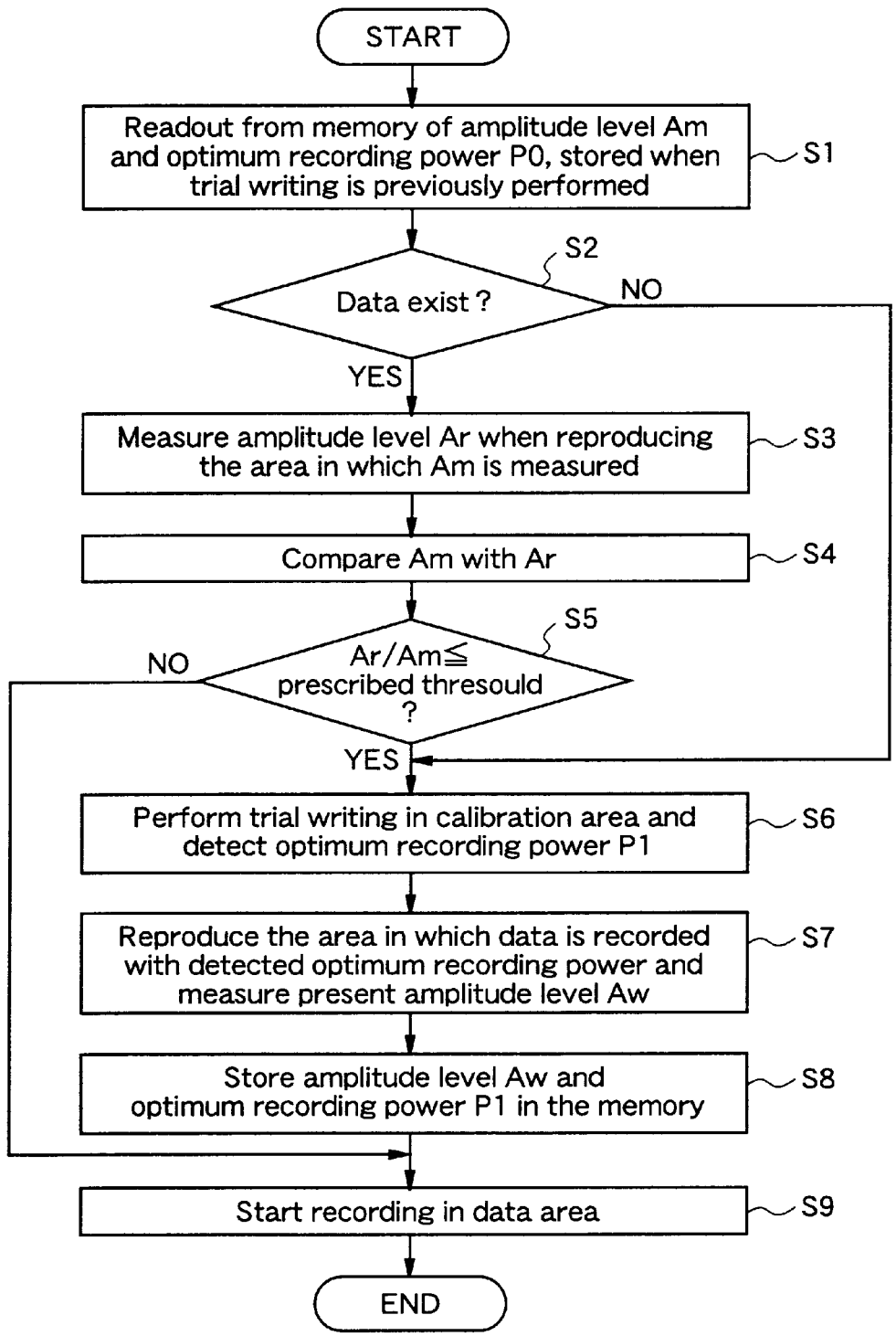
FIG. 2 is a flowchart for explaining an operation of setting an optimum recording power by the optical disk recording apparatus 1 according to the embodiment of the present invention.

Next, an operation of the optical disk recording apparatus 1 according to the embodiment will be described with reference to FIG. 2. FIG. 2 is a flowchart for explaining the operation of setting an optimum recording power by the optical disk recording apparatus 1.

Prior to recording data in the data area 103 on the write-once optical disk 101, an optimum recording power should be obtained.

In steps S1 and S2, it is decided whether data has been recorded on the write-once optical disk 101. That is, it is checked whether information of an optimum recording power or the like relating to the write-once optical disk 101 on which data should be recorded is stored in the memory 114 in the apparatus. First, in step S1, the amplitude level Am and an optimum recording power P0 which are stored when the trial writing is previously performed are read out from the memory 114. In step S2, it is decided whether the amplitude level Am and the optimum recording power P0 are stored. When it is decided that data of the amplitude level Am and the optimum recording power P0 do not exist in the memory 114, the processing goes to step S6.

In step S6, the trial writing is performed once in the power calibration area 102 on the write-once optical disk 101. First, the optimum recording power setting unit 113 sets plural recording power levels of the laser diode 107. The D/A converting circuit 109 D/A-converts the set recording power levels respectively and then the laser driving circuit 108 converts the same into a driving current for driving the laser diode 107 mounted on the pickup 106. Then, the laser diode 107 performs the trial writing in the power calibration area 102 at the set plural different recording power levels.

After the trial writing, the power calibration area 102 is reproduced and asymmetry of reproduction signals (RF signals) thereof is detected, whereby an optimum recording power P1 is detected. That is, the pickup 106 reproduces the power calibration area 102 and the RF signal generating circuit 110 generates an RF signal. Then, the peak/bottom detecting circuit 111 detects a peak level and a bottom level of the RF signal. The A/D converting circuit 112 A/D-converts signals of the detected peak level and bottom level, and the optimum recording power setting unit 13 captures the converted signals. The optimum recording power setting unit 113 detects asymmetry of the RF signals from the peak Level and the bottom level, thereby setting the optimum recording power P1.

Then, in step S7, an area in the power calibration area 102 in which data is recorded with the optimum recording power P1 is reproduced and an amplitude level Aw of an RF signal of the area is detected. That is, the area in which the optimum recording power P1 is detected is reproduced by the pickup 106, and the amplitude level Aw is detected through the RF generating circuit 110, the peak/bottom detecting circuit 111, the A/D converting circuit 112, and the amplitude level calculating unit 115.

In step S8, the optimum recording power P1 detected in step S6 and the amplitude level Aw detected in step S7 are stored in the memory 114. Then, in step S9, recording is started in the data area 103 using the optimum recording power P1.

Hereinafter, an operation of calibrating an optimum recording power prior to the additional recording on the write-once optical disk 101 will be described. That is, the operation when it is decided in step S2 that the data of the amplitude level Am and the optimum recording power P0 exist in the memory 114 will be described. The additional recording is often performed after time elapses from the preceding recording. Therefore, there is a possibility that the optimum recording power changes due to changes with time in the pickup 106 or the like. In this embodiment, since the apparatus has a structure for calibrating the optimum recording power as described later, the apparatus can cope with the case where the optimum power value changes.

As described above, before the additional recording, the optimum recording power P0 at the preceding recording and the amplitude level Am of the RF signal corresponding thereto, which are stored in the memory 114 for each write-once optical disks 101, are read out in step S1. Then, in step S2, it is decided whether the data of the amplitude level Am and the optimum recording power P0 are recorded. In case of the calibration operation, since the data of Am and P0 are already stored, it is decided "YES" and the processing goes to step S3.

In step S3, an area in the power calibration area 102 in which the optimum recording power P0 is detected is reproduced by the pickup 106, and the amplitude level Ar of the RF signal is detected through the RF generating circuit 110, the peak/bottom detecting circuit 111, the A/D converting circuit 112, and the amplitude level calculating unit 115.

In steps S4 and S5, the comparing unit 116 compares the amplitude level Am read out from the memory 114 with the amplitude level Ar detected in step S3. If there are influences of dust or dirt, or changes with time in the pickup 106, the amplitude level Ar naturally becomes smaller than the amplitude level Am. Therefore, if the additional recording is performed using the same optimum recording power P0 as that used at the preceding recording, an appropriate RF signal cannot be obtained.

Accordingly, in step S5, when the ratio Ar/Am of the amplitude level Ar detected at the additional recording to the amplitude level Am detected at the preceding recording is a prescribed threshold or below, it is decided that the optimum recording power should be renewed. Then, the processing of trial writing subsequent to step S6 is performed. A new optimum recording power is obtained and an amplitude is calculated, and the content stored in the memory 114 is renewed with a newly obtained optimum recording power and an amplitude level.

As a result of the comparison in step S5, when the difference between Am and Ar is quite small and the ratio Ar/Am is larger than the prescribed threshold, the processing goes to step S9 and the recording can be performed in the data area 103 using the optimum recording power P0. Therefore, there is no need of trial writing in this case and the consumption of the power calibration area 102 can be reduced. Here, the threshold can be previously set as a value which is decided taking in account of the recording and reproducing performance.

It should be noted that the optimum recording power setting unit 113, the amplitude level calculating unit 115, and the comparing unit 116, which are described in this embodiment are realized by a program by a microcomputer such as a CPU.

As described above, according to this embodiment of the present invention, the optimum recording power and the amplitude level which are obtained by performing the trial writing in the power calibration area are stored in the memory and it is decided whether the stored amplitude level changes when the additional recording is performed. At this time, when the amplitude level greatly changes due to the changes with time in the pickup or the influences of dirt or dust accumulated in the pickup and it is decided that there is a possibility that the recording quality is deteriorated if the recording is performed using the stored optimum recording power, the trial writing is performed again and a new optimum recording power is set. Therefore, even when there exist changes with time in the pickup of the optical disk recording apparatus, or particularly, dirt or dust are accumulated in the pickup, the optimum recording power can be set again, thereby preventing the recording quality from being deteriorated.

Further, the content stored in the memory is renewed with the newly obtained optimum recording power and the amplitude level, whereby the optimum recording power and the amplitude level can be used at the subsequent recording as a reference.

On the other hand, when the amplitude level is not changed, the optimum recording power stored in the memory can be used to record data, thereby reducing the consumption of the power calibration area.

What is claimed is:

1. An optical disk recording apparatus comprising:

an optimum recording power setting unit for obtaining an optimum recording power of a laser diode when data is recorded on an optical disk, by performing trial writing in a power calibration area on the optical disk;

an amplitude level calculating unit for obtaining an amplitude level of a reproduction signal which is obtained by reproducing an area in the power calibration area in which the trial writing is performed with the obtained optimum recording power;

a memory for storing the obtained optimum recording power and the amplitude level of the reproduction signal; and a comparing unit for comparing a difference between the amplitude level of the reproduction signal stored in the memory and an amplitude level of a reproduction signal which is obtained by reproducing again the area in which the trial writing is performed with the optimum recording power, to a prescribed value, when additional recording is performed on the optical disk; wherein the optimum recording power setting unit performs trial writing in the power calibration area and sets an optimum recording power to be used in the additional recording when the comparing unit decides that the difference exceeds the prescribed value, and sets the optimum recording power stored in the memory as an optimum recording power to be used in the additional recording when the comparing unit decides that the difference does not exceed the prescribed value.

2. A method for setting an optimum recording power in an optical disk recording apparatus comprising the steps of:

obtaining an optimum recording power of a laser diode when data is recorded on an optical disk, by performing trial writing in a power calibration area on the optical disk;

obtaining an amplitude level of a reproduction signal which is obtained by reproducing an area in the power calibration area in which the trial writing is performed with the obtained optimum recording power;

storing the obtained optimum recording power and the amplitude level in the memory;

when additional recording is performed on the optical disk, comparing a difference between the amplitude level of the reproduction signal stored in the memory and an amplitude level of a reproduction signal which is obtained by reproducing again the area in which the trial writing is performed with the optimum recording power, to a prescribed value;

performing trial writing in the power calibration area and setting an optimum recording power to be used in the additional recording when it is decided that the difference exceeds the prescribed value; and setting the optimum recording power stored in the memory as an optimum recording power to be used in the additional recording when it is decided that the difference does not exceed the prescribed value.

* * * * *